(12) United States Patent
Ise (10) Patent No.: US 8,174,589 B2
(45) Date of Patent: May 8, 2012

(54) IMAGE SENSING APPARATUS AND CONTROL METHOD THEREFOR

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 12/508,858

(22) Filed: Jul. 24, 2009

(65) Prior Publication Data

US 2010/0053380 A1  Mar. 4, 2010

(30) Foreign Application Priority Data

Aug. 27, 2008  (JP) ................................. 2008-218825

(51) Int. Cl.
*H04N 5/217* (2011.01)
(52) U.S. Cl. ....................................................... 348/241
(58) Field of Classification Search .................... 348/241
See application file for complete search history.

(56) References Cited

U.S. PATENT DOCUMENTS 7,940,320 B2 * 5/2011 Ise ................................. 348/312
2005/0052542 A1 * 3/2005 Iwai et al. .................... 348/222.1
2008/0013858 A1 * 1/2008 Hohda et al. .................. 382/275
2008/0100736 A1 * 5/2008 Ise ................................. 348/311
2009/0174788 A1 * 7/2009 Ise ............................... 348/222.1
2011/0013855 A1 * 1/2011 Ise ................................. 382/275

FOREIGN PATENT DOCUMENTS

| JP | 07-067038 | 3/1995 |
| JP | 2002-152600 | 5/2002 |

* cited by examiner

*Primary Examiner* — Jason Chan
*Assistant Examiner* — Gary C Vieaux
(74) *Attorney, Agent, or Firm* — Cowan, Liebowitz & Latman, P.C.

(57) ABSTRACT

A period of periodical noise caused by a period of a drive signal of a CMOS sensor and a period of a signal generated by driving of a circuit other than the CMOS sensor is acquired, and a length of a horizontal blanking period is adjusted so that one horizontal period of a drive signal of the CMOS sensor becomes an integer multiple of the periodical noise period. Then, column noise is detected from an image signal read out by driving the CMOS sensor with a drive signal based on one horizontal period after the adjustment and the detected column noise is subtracted from the image signal.

4 Claims, 6 Drawing Sheets

FIG. 6

IMAGE SENSING APPARATUS AND CONTROL METHOD THEREFOR

BACKGROUND OF THE INVENTION

1. Field of the Invention

The present invention relates to an image sensing apparatus and a control method therefor, and more particularly, to an image sensing apparatus that senses a subject image using a solid-state image sensor such as a CCD, CMOS sensor, or the like, and a control method therefor.

2. Description of the Related Art

In recent years, image sensing apparatuses such as digital cameras and the like, which use a memory card having a solid-state memory element as a recording medium and which record and playback images sensed with a solid-state image sensor such as a CCD, CMOS sensor, or the like, have been successfully developed and widely diffused. At the same time, improvements in resolution and operating speed with respect to both still image and moving image photography are sought for these image sensing apparatuses. Accordingly, increases in the frequencies of the drive signals for driving the solid-state image sensors that constitute digital cameras and the like, as well as increases in the drive frequencies of analog signal processing circuits, A/D converters, and later-stage digital signal processing circuits continue to come at a rapid pace.

Moreover, recently, in addition to improvements in picture quality such as high picture quality and high definition, there has also come to be heightened demand for easy usage that allows near-perfect photography for a variety of different photographic scenes. Accordingly, in order to track quickly moving objects such as in sports scenes and the like, or to prevent camera shake during indoor photography under low luminance, shutter speeds have become faster. Further, in order to make possible photography in places where the use of flash photography is forbidden, such as art museums and aquariums, even further improvement of sensitivity of the image sensor is sought.

In addition to the solid-state image sensor and its driving circuit, these image sensing apparatuses also have a system control circuit such as a CPU, a memory circuit such as a DRAM, and a display circuit such as an LCD. Each of these circuits operates on different high-frequency clock signals. In image sensing apparatuses in which these multiple clock signals of different frequencies are present, the surface area of the substrate has shrunk as the apparatus has been made more compact to the point where clock interference between the circuits can no longer be ignored. Thus, for example, periodical noise caused by interfering clock frequencies is superimposed on the image signal as diagonal stripes of an even pitch (hereinafter called "beat noise"), and this periodical noise is amplified by heightened sensitivity, thus further degrading the quality of the obtained image.

As a factor causing degradation of the quality of the image in the image sensing apparatus, in addition to the system-generated beat noise described above there is also vertical line column noise caused by the structure of the image sensor. For example, vertical stripes caused by defects in the vertical transfer register in the CCD sensor, as well as smears appearing when extremely bright light strikes the sensor, are known. Moreover, in X-Y address-type sensors such as those typified by the CMOS sensor, typically, from photoelectric converter elements arranged in columns and rows, signals from selected rows are read out through vertical signal lines that are the same for each row but different for each column. Consequently, column noise arises easily due to variation in element characteristics from one column to another.

In the conventional art, in order to extract and cancel out this column noise superimposed on the image signal, the output of optical black pixels composed of a plurality of lines positioned in the vertical direction of an effective pixel area of the solid-state image sensor is integrated and stored in a storage unit as one horizontal period of image data. Then, the stored one horizontal period of stored image data is subtracted from the effective pixel data and the superimposed noise is removed, as is proposed, for example, in Japanese Patent Laid-Open No. 7-67038.

In addition, a technique for canceling out beat noise is proposed, for example, in Japanese Patent Laid-Open No. 2002-152600. In Japanese Patent Laid-Open No. 2002-152600, a multi-channel clamp circuit is provided that has multiple channels of the same number as the number of pixels that corresponds to one period of the beat noise formed by two types of clocks, and which successively integrates the signals of the pixels in the optical black area currently being read in at each of the multiple channels. Then, this per-channel integrated value is subtracted from the input image data and the beat noise is removed.

However, in Japanese Patent Laid-Open No. 7-67038, because multiple horizontal periods of image data are integrated as a single horizontal period signal, only column noise generated in the vertical direction can be extracted. Consequently, this approach cannot cope with system-generated beat noise appearing in the diagonal direction.

Moreover, in Japanese Patent Laid-Open No. 2002-152600, because dedicated detection circuits and integration circuits of the same number as the number of pixels that corresponds to the period of the beat noise are required, the structure of the circuit depends on the length of the period of the beat noise. Consequently as the period of the beat noise lengthens the circuit scale increases and cannot cope.

SUMMARY OF THE INVENTION

The present invention has been made in consideration of the above situation, and reduces beat noise and column noise while keeping the circuit scale small.

According to the present invention, the foregoing object is attained by providing an image sensing apparatus comprising: an acquisition unit that acquires a period of periodical noise caused by a period of a drive signal of an image sensor and a period of a signal generated by driving of a circuit other than the image sensor; a control unit that adjusts a length of a horizontal blanking period so that one horizontal period of a drive signal of the image sensor becomes an integer multiple of the period of the periodical noise; a column noise detection unit that detects column noise from an image signal read out by driving the image sensor with a drive signal based on one horizontal period after the adjustment by the control unit; and a column noise reduction unit that subtracts column noise detected by the column noise detection unit from the image signal.

According to the present invention, the foregoing object is also attained by providing a control method of an image sensing apparatus comprising: an acquisition step of acquiring a period of periodical noise caused by a period of a drive signal of an image sensor and a period of a signal generated by driving of a circuit other than the image sensor; a first adjustment step of adjusting a length of a horizontal blanking period so that one horizontal period of a drive signal of the image sensor becomes an integer multiple of the period of the periodical noise; a column noise detection step of detecting column noise from an image signal read out by driving the image sensor with a drive signal based on one horizontal period after the adjustment in the first adjustment step; and a column noise reduction step of subtracting column noise detected in the column noise detection step from the image signal.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

(First Embodiment)

Figure 1:
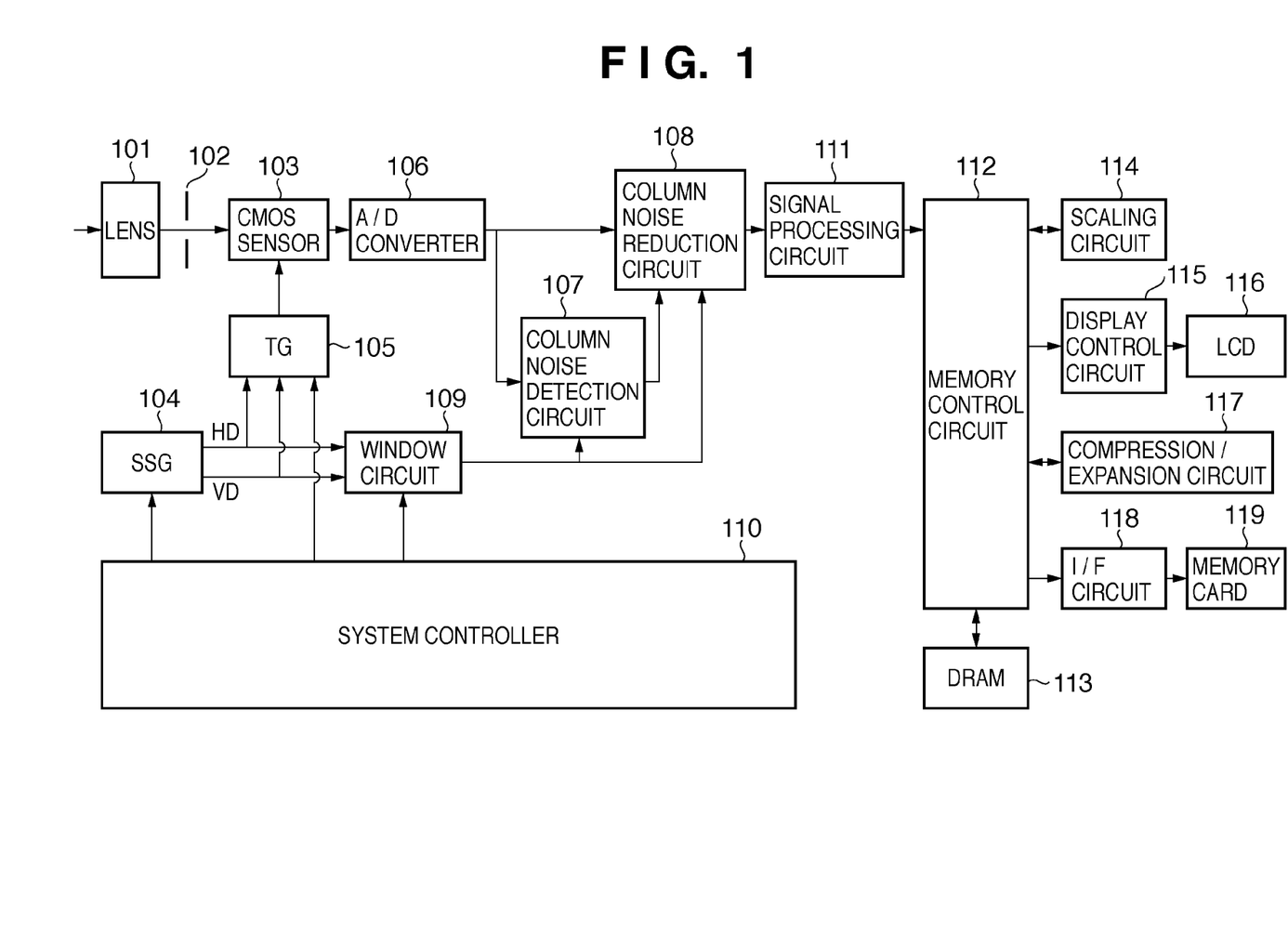
FIG. 1 is a block diagram illustrating the overall configuration of an image sensing apparatus according to a first embodiment of the present invention.

FIG. 1 is a block diagram illustrating the overall configuration of an image sensing apparatus according to a first embodiment of the present invention.

In FIG. 1, reference numeral 101 designates a lens, 102 designates an aperture, and 103 designates a CMOS sensor that converts optical signals into electrical signals.

Figure 2:
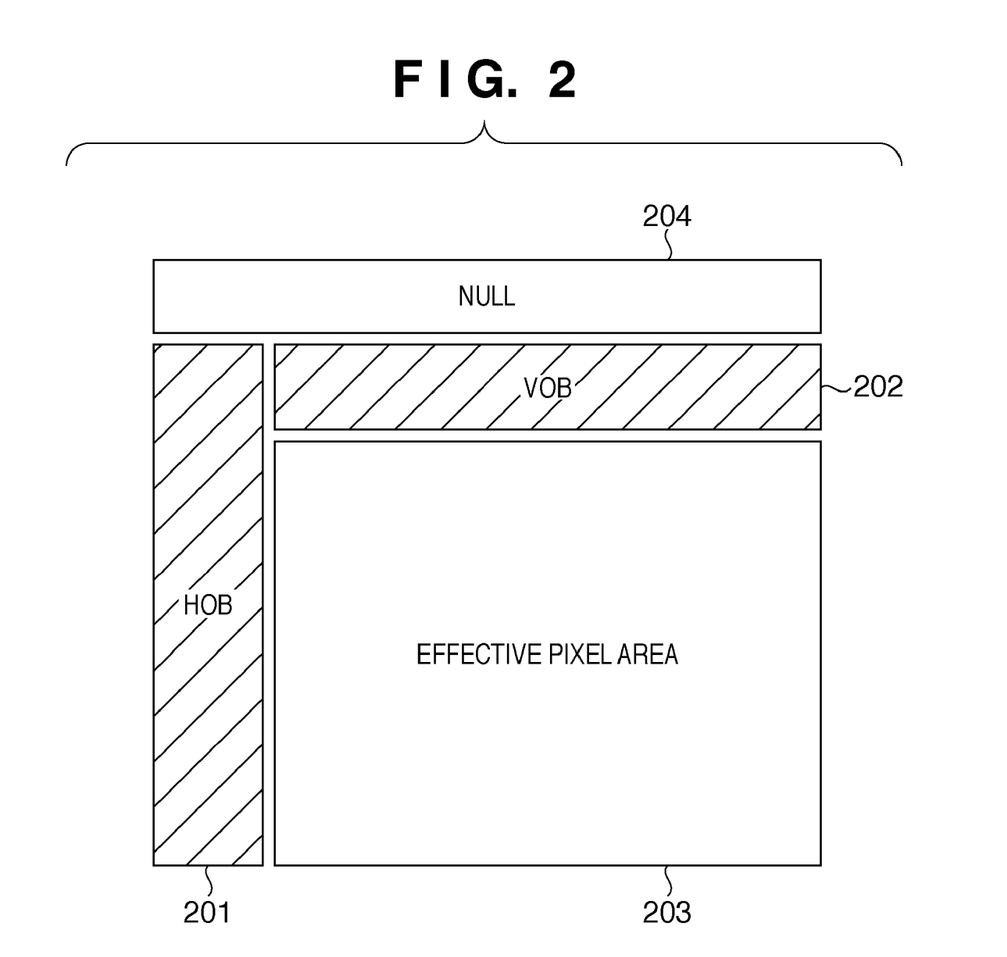
FIG. 2 is a diagram illustrating an area of a pixel arrangement of a sensor according to the first embodiment of the present invention.

The CMOS sensor 103 includes an effective pixel area 203 as shown in FIG. 2, in which light illuminates photodiodes that are photoelectric converter elements. In addition, the CMOS sensor 103 also includes a horizontal optical black (HOB) area 201, in which the photodiodes are blocked from light by an aluminum thin film over several rows to several tens of rows, and a vertical optical black (VOB) area 202, in which the photodiodes are blocked from light by an aluminum thin film over several lines to several tens of lines. Further, the CMOS sensor 103 is comprised of a (NULL) area 204, in which electrical charge signals from the photodiodes are not connected electrically.

Reference numeral 104 designates a synchronization signal generator (SSG) that generates horizontal synchronization signals (HD signals) and vertical synchronization signals (VD signals), and reference numeral 105 designates a timing generator (TG) that generates various types of control signals for driving the CMOS sensor 103 in synchronization with the HD signals and the VD signals.

Reference numeral 106 designates an A/D converter that converts analog image signals into digital image signals. Reference numeral 107 designates a column noise detection circuit that extracts from image data of a NULL area a column noise component included in the image data output from the A/D converter 106. Reference numeral 108 designates a column noise reduction circuit that subtracts from the image data of the effective pixel area the column noise detected in the column noise detection circuit 107.

Reference numeral 109 designates a window circuit that generates control signals that drive the column noise detection circuit 107 and the column noise reduction circuit 108. Reference numeral 110 designates a system controller that controls the circuits and determines operating modes and parameters, and reference numeral 111 designates a signal processing circuit that performs image processing such as interpolation and color conversion on the image data.

Reference numeral 113 designates a DRAM that temporarily stores image data that has been signal processed, 112 designates a memory control circuit that performs bus mediation between the DRAM 113 and the various circuits, and 114 designates a scaling circuit that shrinks or enlarges the image data. Reference numeral 116 designates an LCD that is a display device that displays images, and 115 designates a display control circuit for displaying image data on the LCD 116.

Reference numeral 117 designates a compression/expansion circuit for compressing or expanding images using compression systems such as JPEG compression or the like. Reference numeral 119 designates a detachable memory card that records image data compressed by the compression/expansion circuit 117, and 118 designates an I/F circuit that provides an interface for the memory card 119.

Next, a description is given of operation of the image sensing apparatus having the configuration described above.

The TG 105 generates various control signals that drive the CMOS sensor 103 from the HD signals and the VD signals generated in the SSG 104. The CMOS sensor 103 converts the light that has passed through the lens 101 and the aperture 102 into electrical signals at a timing determined by the control signals from the TG 105. The electrical signals (analog image signals) read out from the CMOS sensor 103 are converted from analog image signals into digital image data at the A/D converter 106 and output to the column noise detection circuit 107 and the column noise reduction circuit 108.

The window circuit 109 references the HD signals and the VD signals and supplies to the column noise detection circuit 107 a detection-allowed signal (VWDET) that defines the detection period in the NULL area. Further, the window circuit 109 supplies a reduction-allowed signal (VWCOL) to the column noise reduction circuit 108 that defines a reduction period that reduces the column noise component in the effective pixel area.

The column noise detection circuit 107 computes column noise data in accordance with the detection-allowed signal (VWDET) supplied from the window circuit 109. Then, in accordance with the reduction-allowed signal (VWCOL) supplied from the window circuit 109, the column noise reduction circuit 108 subtracts the column noise data averaged at every column and computed by the column noise detection circuit 107 from the effective pixel signal and reduces the column noise component.

The image data output from the column noise reduction circuit 108 is signal-processed at the signal processing circuit 111 and stored to the DRAM 113 through the memory control circuit 112.

The scaling circuit 114 reads out the image data stored in the DRAM 113, sizes the read-out image data to fit the display size for display on the LCD 116, and displays the sized image data on the LCD 116 through the display control circuit 115.

The compression/expansion circuit 117 compresses the image data read out from the DRAM 113 and writes the compressed image data to the DRAM 113. Further, at the I/F circuit 118, compressed image data read out from the DRAM 113 is written to the memory card 119.

Figure 3:
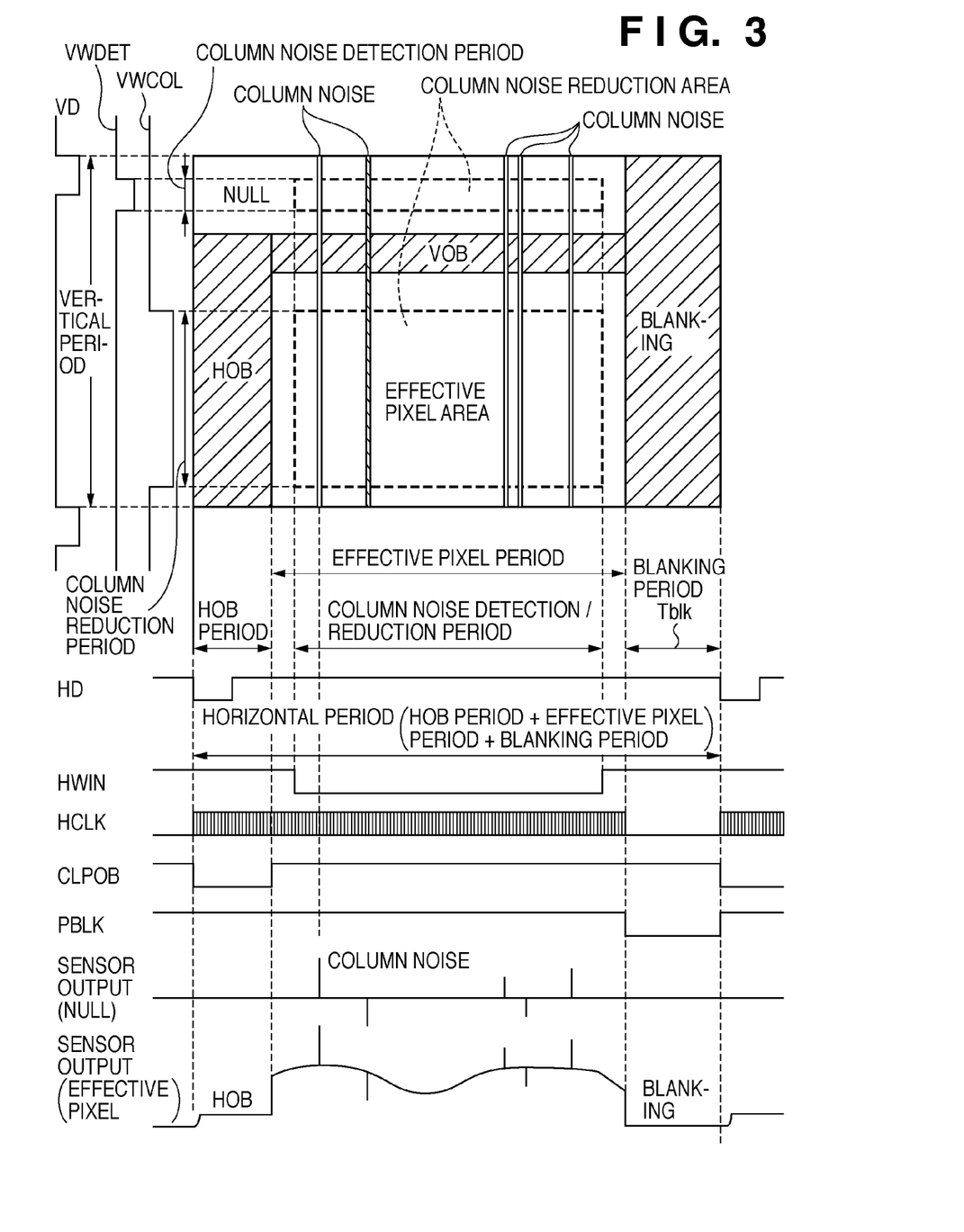
FIG. 3 is a diagram illustrating sensor signal readout timing during still image photography according to the first embodiment of the present invention.

FIG. 3 is a diagram illustrating main component timing signals and sensor output in synchronization with the timing signals during operation of the image sensing apparatus described above.

In addition to the synchronization signals HD and VD, the TG 105 also supplies to the CMOS sensor 103 an HCLK signal as a clock signal for reading out a signal from the CMOS sensor 103 at each pixel.

The HCLK is a read-out control signal that, in order to read out the pixel signals of each of the HOB area, the VOB area, the effective pixel area, and the NULL area of the CMOS sensor 103, controls sensor output in units of one pixel period, and stops sensor output in a read-out prohibited period.

The TG 105 further supplies to the CMOS sensor 103 a CLPOB that is a control signal for selecting and extracting from each of the NULL area, the VOB area, and the HOB area pixel signals that become black reference of the sensor output.

The pixel signals from HOB area and the VOB area extracted in accordance with the CLPOB signal are subtracted from the center output and the remainder is output, thus enabling to obtain stable sensor output with no fluctuation in black level.

The timing of a PBLK signal indicates a blanking period (Tblk) that stops readout of sensor output in one horizontal period, expressed, in other words, as follows:

1 horizontal period=effective pixel period+HOB period+Tblk

The CMOS sensor 103 has an X-Y address-type readout structure like that described in the background art, and so-called column noise, that is offsets superimposed on sensor output and different at each column due to variation in element characteristics from one column to another during readout, arises easily. As a result, the column noise tends to occur equally in the same columns having the same readout paths in common for each of the NULL area, the VOB area, the HOB area, and the effective pixel area. In FIG. 3, the waveforms of the sensor output of the NULL area and the sensor output of the effective pixel area schematically illustrate the characteristics of the column noise superimposed thereupon.

Further, as noted in the background art, in addition to the column noise, beat noise of a particular pixel period caused by interference between clock signals of different frequencies from circuits other than the image sensor is also easily superimposed on the output of the CMOS 103 sensor.

A description is now given of the form of this beat noise, using as an example a case in which, for example, a 27 MHz operating clock for the LCD 116 interferes with a 33.75 MHz readout control signal HCLK, and the resultant beat noise is superimposed on the sensor output read out in accordance with the 33.75 MHz readout control signal HCLK.

In this case, in post-sampling image data of the A/D converter 106, 6.75 MHz of periodical noise, which is the frequency component difference between the two frequencies (=33.75−27 MHz), remains, representing a frequency component of one fifth of the 33.75 MHz image sensing clock, which means, in other words, equal pitch noise of 5 pixel periods in the horizontal direction.

Figure 4A:
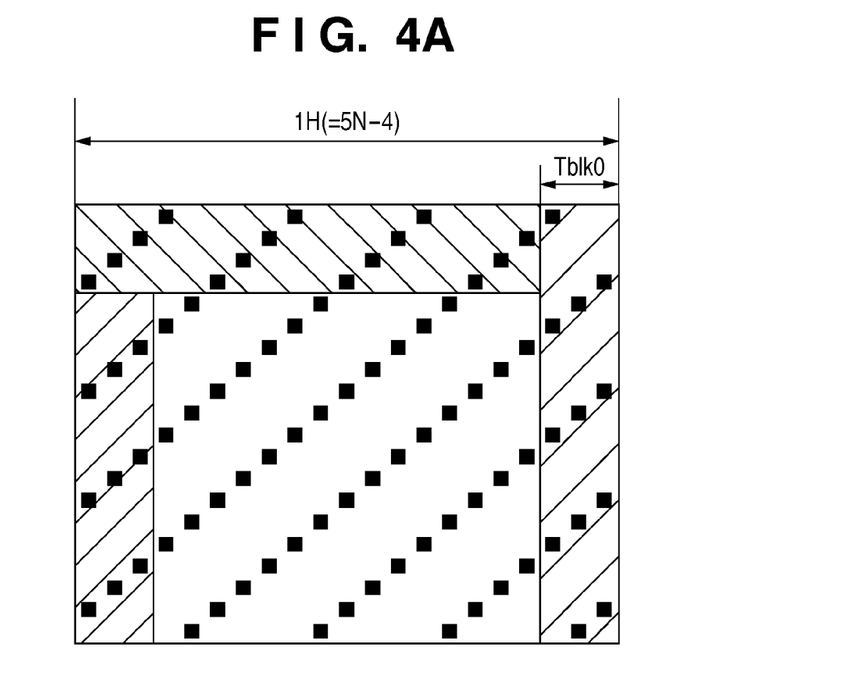
FIGS. 4A and 4B are schematic diagrams representing beat noise of an image sensing apparatus according to the first embodiment of the present invention.
Figure 4B:
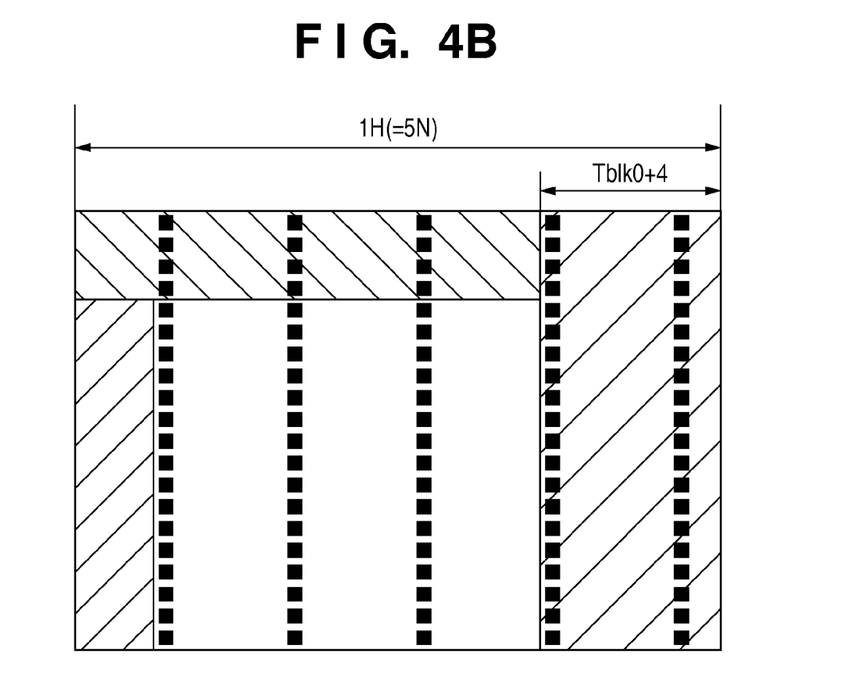

FIGS. 4A and 4B are schematic diagrams showing even pitch noise of 5 pixel periods in the horizontal direction superimposed on image data that is rendered on a two-dimensional image so as to see its characteristics clearly.

Depending on the length of the horizontal period (1H), noise patterns appear in five variations according to patterns of the remainder of the divisor 5. Although there is no change in noise pitch in the horizontal direction, on a rendered two-dimensional image the angle of the noise pattern changes greatly due to this variation.

FIG. 4A shows a noise pattern that appears as slanted lines in a case in which the length of 1H is set arbitrarily and the length of 1H is 5N−4 (where N is a positive integer). The blanking period at this time is Tblk0.

FIG. 4B shows a noise pattern that appears as vertical lines (on the same columns) in a case in which the blanking period is adjusted from the Tblk0 described above so as to be extended by four pixel clock periods, making the length of 1H equal to 5N (where N is a positive integer)

Thus, as described above, in the first embodiment of the present invention the lengths of the blanking period and 1H of the image sensing apparatus are adjusted according to various conditions of the image sensing apparatus, such that the beat noise that is generated is deliberately made to form a vertical line noise pattern (on the same columns). By so doing, the beat noise as well as the column noise can be detected and reduced by the column noise detection circuit 107 and the column noise reduction circuit 108.

Figure 5:
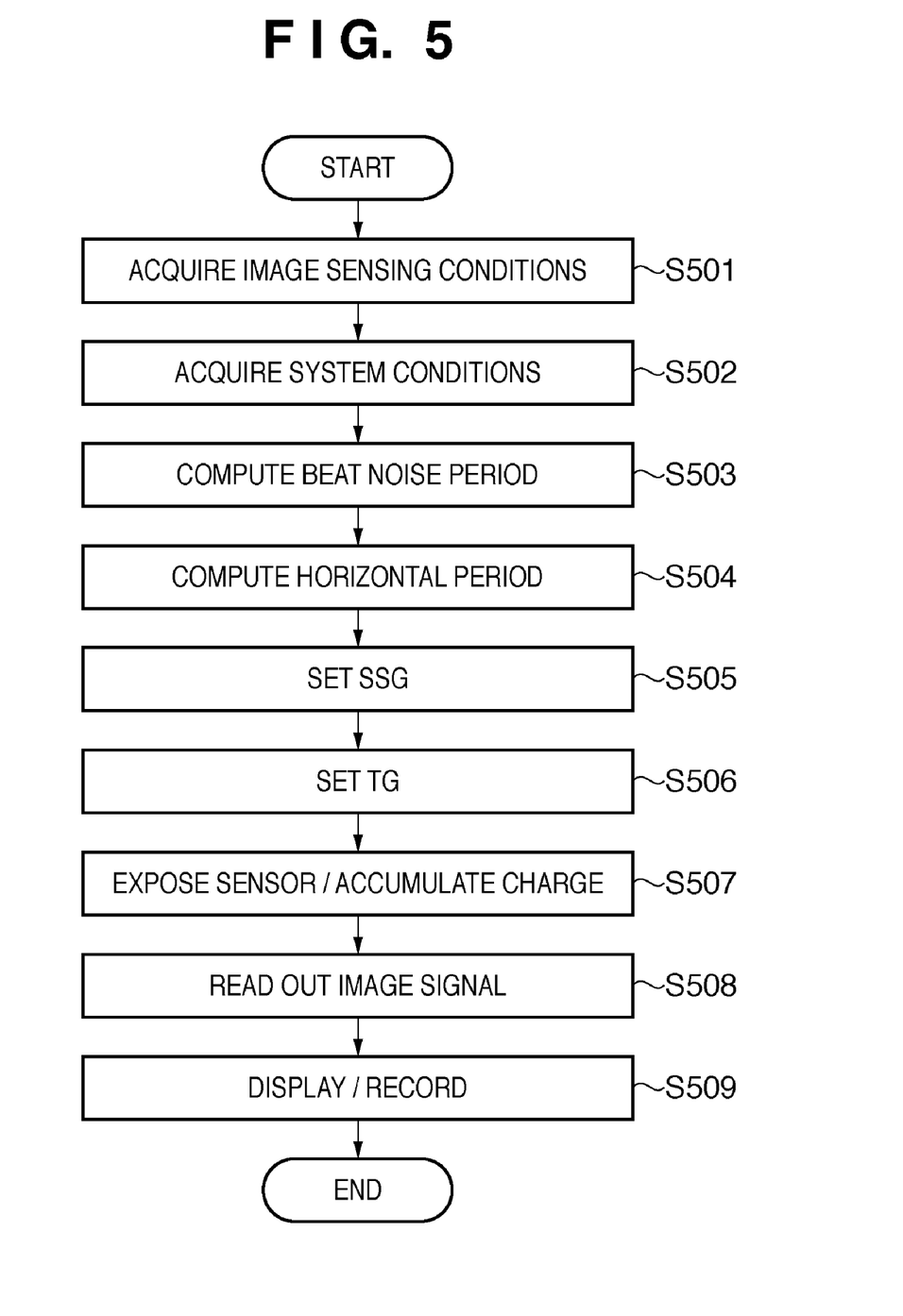
FIG. 5 is a flowchart showing steps in a photographing operation according to the first embodiment of the present invention.

FIG. 5 is a flowchart showing steps in a photographing operation using the system controller 110 for that purpose.

A photographing operation is commenced by a photography start instruction from a user (for example, by pressing a release button, not shown).

When a photographing operation is commenced, the system controller 110 first acquires various types of setting information, such as readout size and speed, which are the image sensing conditions for the CMOS sensor 103, and determines the image sensing frequency (fc) and the like (step S501). Next, the system controller 110 acquires system conditions, such as the operating frequency of the system controller itself and the operating frequency of the LCD, and identifies system frequencies (fn) that can become possible sources of noise (step S502).

Then, the system controller 110 computes the beat noise period (Tb) from the above-described image sensing frequency and system frequency (step S503).

$$Tb=fc/|fc-fn|$$

Subsequently, the system controller 110 adjusts the blanking period (Tblk) so that the horizontal period (1H) becomes an integer multiple of the beat noise period (Tb) (step S504), and sets the SSG 104 HD signal (step S505).

Then, based on the image sensing conditions acquired in step S501, the system controller 110 sets the various drive signals of the TG 105 that drives the CMOS sensor 103 (step S506). Through the TG 105, the CMOS sensor 103 is exposed and electrical charge accumulation is carried out (step S507). After a predetermined exposure time period has elapsed, sensor output from the CMOS sensor 103 is read out and the beat noise is detected and reduced together with the column noise, in other words, the beat noise as one type of column noise, while reading out the sensor output (step S508).

A signal-processed image signal is then displayed on the LCD 116 and recorded on the memory card 119 (step S509), and the image sensing process is ended.

Thus, as described above, according to the first embodiment, by adjusting the blanking period and making the horizontal period an integer multiple of the beat noise period, the beat noise and the column noise can be reduced using a circuit that is for reducing the column noise.

(Second Embodiment)

Next, a description is given of a second embodiment of the present invention.

In the first embodiment above, a description is given mainly of a still image photographing operation. However, at moving image sensing as well, the horizontal period is controlled so that the beat noise is made to form a vertical line noise pattern (on the same columns) so that the beat noise can be detected and reduced together with the column noise as the beat noise being one type of column noise. Accordingly, in the second embodiment, a description is given of adaptation to a photographing operation at moving image sensing.

At moving image sensing, a basic operation for reducing the beat noise from each of still images that forms a moving image is the same as that explained above in the first embodiment. Further, a structure of an apparatus (FIG. 1) and steps of operation (FIG. 5) are also the same as those explained above in the first embodiment. Here, the timing of HD signals, VD signals, a PBLK signal which is different from the first embodiment is explained with reference to FIG. 6.

Figure 6:
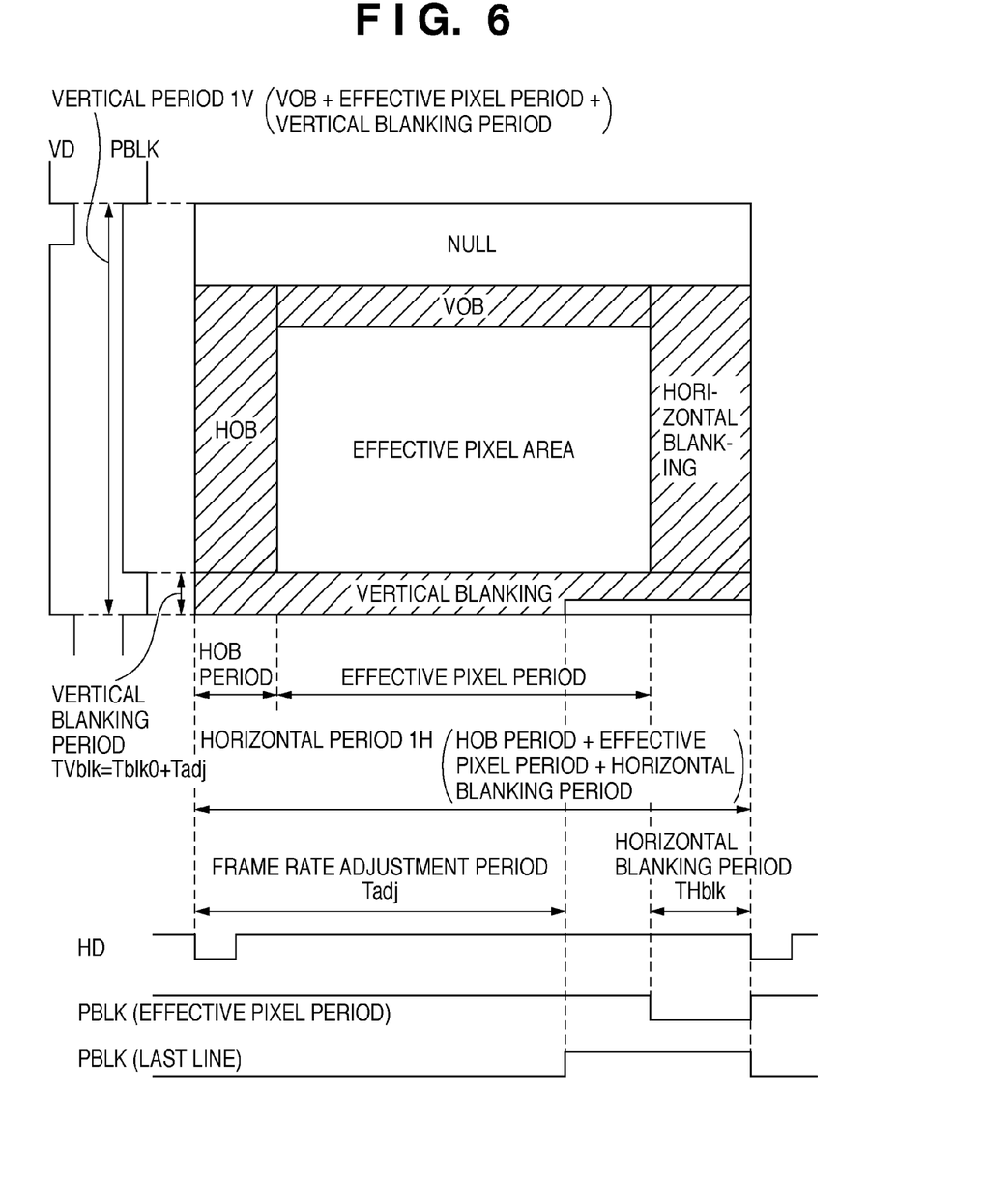
FIG. 6 is a diagram illustrating sensor signal readout timing during moving image sensing according to a second embodiment of the present invention.

FIG. 6 is a diagram illustrating main component timing signals during operation of the image sensing apparatus.

The timing of the PBLK signal that stops readout of the sensor output is determined by a sensor output horizontal blanking period THblk and a vertical blanking period TVblk. The horizontal period (1H) is composed of the effective pixel period, the HOB period, and the THblk period, and is expressed as:

Horizontal period (1$H$)=effective pixel period+HOB period+THblk period

In addition, one vertical period (1V), which is a unit of time that constitutes one frame of a moving image, is composed of the effective pixel period, the VOB period, and the TVblk period, and is expressed as:

Vertical period (1$V$)=effective pixel period+VOB period+TVblk period

Further, the vertical blanking period (TVblk) is composed of a fixed blanking period TVblk0 and a frame rate adjustment period Tadj provided at the last line for adjusting the length of the vertical period (1V).

As in the first embodiment described above, the blanking period (THblk) is adjusted so that the horizontal period (1H) becomes an integer multiple of the beat noise period (Tb). However, when that adjustment is carried out, the length of the vertical period (1V) also changes in proportion to the length of the horizontal period (1H). When the length of the vertical period (1V) changes, the moving image frame rate (the number of photographed frames per second) also changes, so that, for example, a moving image formatted to a fixed frame rate such as a television signal cannot be accommodated.

Accordingly, in the second embodiment, the length of the vertical period (1V) is adjusted so as to become a fixed value in accordance with changes in the length of the horizontal period (1H). For that purpose, an adjustment period Tadj is provided to the last line of the vertical period (1V).

For example, assume that the number of all the lines excluding the last line of the vertical blanking interval (TVblk) is 500. In this case, shortening the horizontal blanking interval (THblk) by two pixel clocks shrinks the number of pixel clocks per vertical interval (1V) by 1000 pixel clocks, and therefore the adjustment interval Tadj is increased by that amount. Conversely, if the horizontal blanking interval (THblk) is increased by two pixel clocks, the adjustment interval Tadj is shortened by that amount.

Thus, as described above, according to the second embodiment, by absorbing the fluctuation in one horizontal period with the vertical blanking period, the beat noise can be reduced in moving images as well, and moreover, the moving image frame rate can be set to a predetermined value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-218825, filed on Aug. 27, 2008, which is hereby incorporated by reference herein in its entirety.

What is claimed is:

1. An image sensing apparatus comprising:
an acquisition unit that acquires a period of periodical noise caused by a period of a drive signal of an image sensor and a period of a signal generated by driving of a circuit other than the image sensor;
a control unit that adjusts a length of a horizontal blanking period so that one horizontal period of a drive signal of the image sensor becomes an integer multiple of the period of the periodical noise;
a column noise detection unit that detects column noise from an image signal read out by driving the image sensor with a drive signal based on one horizontal period after the adjustment by the control unit; and
a column noise reduction unit that subtracts column noise detected by the column noise detection unit from the image signal.

2. The image sensing apparatus according to claim 1, further comprising a driving unit that drives the image sensor so as to read out image signals at a predetermined frame rate from the image sensor,
wherein the control unit adjusts a length of a vertical blanking period so that one vertical period of a drive signal of the image sensor becomes the predetermined frame rate.

3. A control method of an image sensing apparatus comprising:
an acquisition step of acquiring a period of periodical noise caused by a period of a drive signal of an image sensor and a period of a signal generated by driving of a circuit other than the image sensor;
a first adjustment step of adjusting a length of a horizontal blanking period so that one horizontal period of a drive signal of the image sensor becomes an integer multiple of the period of the periodical noise;
a column noise detection step of detecting column noise from an image signal read out by driving the image sensor with a drive signal based on one horizontal period after the adjustment in the first adjustment step; and
a column noise reduction step of subtracting column noise detected in the column noise detection step from the image signal.

4. The image sensing apparatus control method according to claim 3, further comprising:
a readout step of reading out an image signal at a predetermined frame rate from the image sensor; and
a second adjustment step of adjusting a length of a vertical blanking period so that one vertical period of a drive signal of the image sensor becomes the predetermined frame rate.

* * * * *